United States Patent
Hsu et al.

(10) Patent No.: US 12,439,295 B2
(45) Date of Patent: Oct. 7, 2025

(54) METHOD AND APPARATUS FOR PERFORMING TRAFFIC FLOW MANAGEMENT IN WIRELESS COMMUNICATIONS SYSTEM WITH AID OF AUXILIARY INFORMATION

(71) Applicant: MEDIATEK INC., Hsin-Chu (TW)

(72) Inventors: Chien-Fang Hsu, Hsinchu (TW); Hao-Hua Kang, Hsinchu (TW); Chih-Chun Kuo, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 357 days.

(21) Appl. No.: 17/844,707

(22) Filed: Jun. 20, 2022

(65) Prior Publication Data

US 2023/0024093 A1    Jan. 26, 2023

Related U.S. Application Data

(60) Provisional application No. 63/237,556, filed on Aug. 27, 2021, provisional application No. 63/222,491, filed on Jul. 16, 2021.

(51) Int. Cl.
*H04W 28/08* (2023.01)
*H04L 47/2441* (2022.01)
*H04W 28/24* (2009.01)

(52) U.S. Cl.
CPC ..... *H04W 28/0992* (2020.05); *H04L 47/2441* (2013.01); *H04W 28/0967* (2020.05); *H04W 28/24* (2013.01)

(58) Field of Classification Search
CPC ......... H04W 28/0992; H04W 28/0967; H04W 28/24; H04W 24/02; H04L 47/2441
See application file for complete search history.

(56) References Cited

U.S. PATENT DOCUMENTS

| | | | |
|---|---|---|---|
| 12,284,552 B2 * | 4/2025 | Hsu | H04L 47/2441 |
| 2021/0195607 A1 | 6/2021 | Zhu | |
| 2021/0219186 A1 | 7/2021 | Canpolat | |
| 2022/0167373 A1 * | 5/2022 | Lin | H04W 72/569 |
| 2024/0291763 A1 * | 8/2024 | Viger | H04L 47/24 |

* cited by examiner

*Primary Examiner* — Gary Mui
(74) *Attorney, Agent, or Firm* — Winston Hsu

(57) ABSTRACT

A method for performing traffic flow management with aid of auxiliary information and associated apparatus are provided. The method may include: carrying first auxiliary information in at least one first data unit of first data units in a first stream, wherein the first stream and a second stream are assigned to a same traffic identifier (TID); and sending the at least one first data unit carrying the first auxiliary information and at least one second data unit in the second stream to the second device, wherein the first auxiliary information comprises an indication of the first data units being part of the first stream.

20 Claims, 9 Drawing Sheets

METHOD AND APPARATUS FOR PERFORMING TRAFFIC FLOW MANAGEMENT IN WIRELESS COMMUNICATIONS SYSTEM WITH AID OF AUXILIARY INFORMATION

CROSS REFERENCE TO RELATED APPLICATIONS

This application claims the benefit of U.S. Provisional Application No. 63/222,491, filed on Jul. 16, 2021. Further, this application claims the benefit of U.S. Provisional Application No. 63/237,556, filed on Aug. 27, 2021. The contents of these applications are incorporated herein by reference.

BACKGROUND

The present invention is related to communications control, and more particularly, to a method for performing traffic flow management in a wireless communications system with aid of auxiliary information, and associated apparatus such as an access point (AP) device and a station (STA) device.

According to the related art, on the AP side, if there are multiple stream classification service (SCS) streams that are mapped to the same traffic identifier (TID), or there are other non-SCS streams mapped to the same TID, a receiving STA cannot identify which medium access control (MAC) service data unit (MSDU) is a part of an SCS stream with quality of service (QoS) requirements so that they cannot be processed with corresponding receiving policies. Thus, a novel method and associated architecture are needed for solving the problems of the related art without introducing any side effect or in a way that is less likely to introduce a side effect.

SUMMARY

It is an objective of the present invention to provide a method for performing traffic flow management in a wireless communications system with aid of auxiliary information, and associated apparatus such as an access point (AP) device and a station (STA) device, in order to solve the above-mentioned problems.

At least one embodiment of the present invention provides a method for performing traffic flow management in a wireless communications system with aid of auxiliary information, where the wireless communications system comprises a first device (e.g., the AP device) and a second device (e.g., the STA device), and the method is applicable to the first device. For example, the method may comprise: carrying first auxiliary information in at least one first data unit of first data units in a first stream, wherein the first stream and a second stream are assigned to a same traffic identifier (TID); and sending the at least one first data unit carrying the first auxiliary information and at least one second data unit in the second stream to the second device, wherein the first auxiliary information comprises an indication of the first data units being part of the first stream.

In addition to the method mentioned above, the present invention further provides a first device (e.g., the AP device) for performing traffic flow management in a wireless communications system with aid of auxiliary information, where the wireless communications system comprises the first device (e.g., the AP device) and a second device (e.g., the STA device). The first device may comprise a processing circuit and at least one communications control circuit that is coupled to the processing circuit. The processing circuit may be arranged to control operations of the first device, and the at least one communications control circuit may be arranged to perform communications control, and more particularly, perform wireless communications operations with the second device for the first device. For example, the first device is arranged to carry first auxiliary information in at least one first data unit of first data units in a first stream, wherein the first stream and a second stream are assigned to a same traffic identifier (TID); and the first device is arranged to send the at least one first data unit carrying the first auxiliary information and at least one second data unit in the second stream to the second device, wherein the first auxiliary information comprises an indication of the first data units being part of the first stream.

It is an advantage of the present invention that, through proper design, the present invention method, as well as the associated apparatus such as the first device (e.g., the AP device) and the second device (e.g., the STA device), can enhance the overall performance of the wireless communications system. For example, on the AP side such as the AP device, if there are multiple SCS streams that are mapped or assigned to the same TID, or there are other non-SCS streams mapped or assigned to the same TID, the present invention method can guarantee that a receiving STA such as the STA device can identify which data unit (e.g., MSDU) is a part of an SCS stream with certain requirements (e.g., QoS requirements) so that they can be processed with corresponding receiving policies, for example, by inserting an SCS identifier (SCSID) in the data unit (e.g., MSDU or MAC protocol data unit (MPDU) header) that is a part of the SCS stream and/or by using the AP device to analyze the SCS stream and notify the STA device of the associated information. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . .". Also, the term "couple" is intended to mean either an indirect or direct electrical connection. Accordingly, if one device is coupled to another device, that connection may be through a direct electrical connection, or through an indirect electrical connection via other devices and connections.

Figure 1:
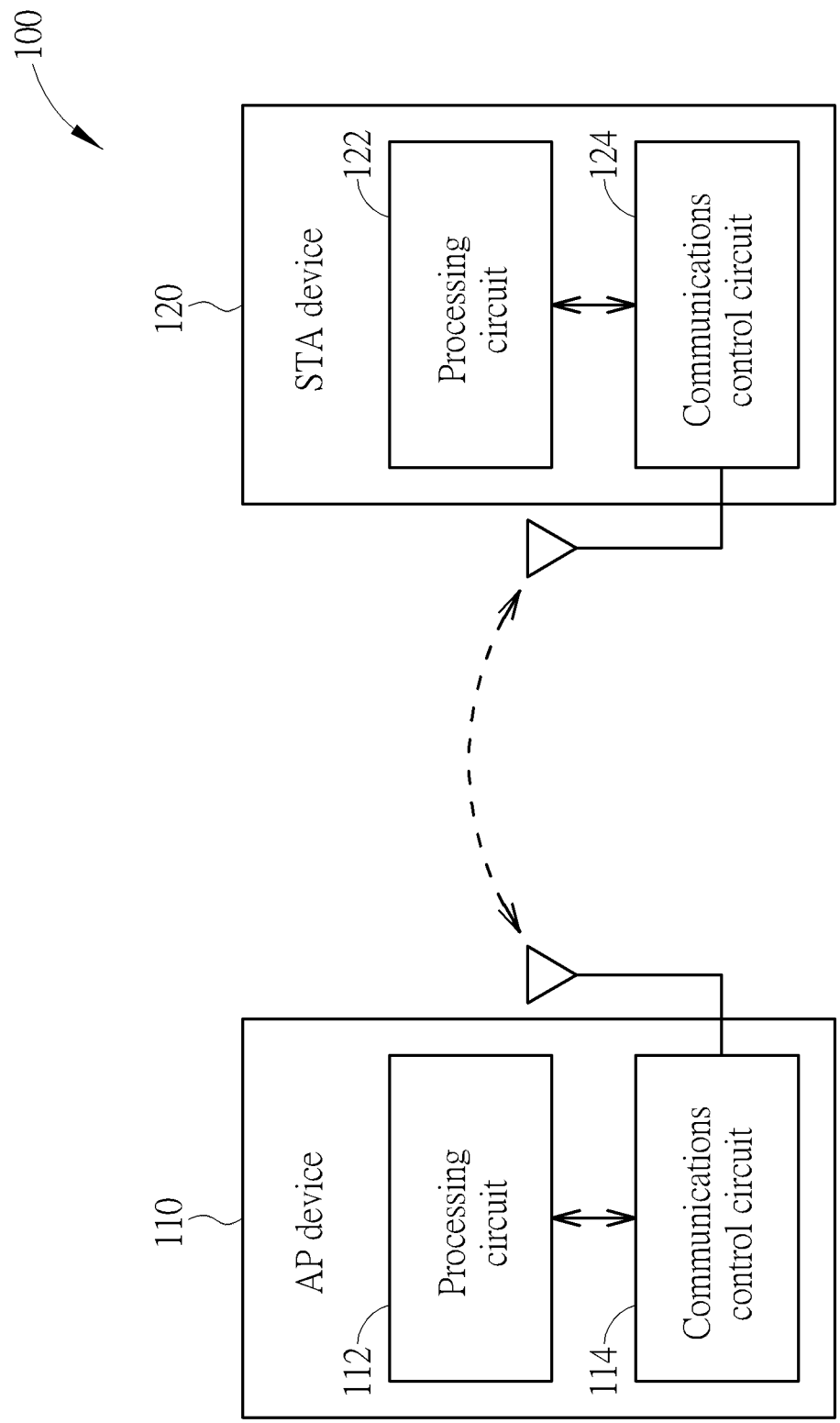
FIG. 1 is a diagram of a wireless communications system according to an embodiment of the present invention.

FIG. 1 is a diagram of a wireless communications system 100 according to an embodiment of the present invention. For better comprehension, the wireless communications system 100 (e.g., any device therein) may be compatible or back-compatible to one or more versions of the Institute of Electrical and Electronics Engineers (IEEE) 802.11 standards, but the present invention is not limited thereto. As shown in FIG. 1, the wireless communications system 100 may comprise multiple devices, for example, a first device such as the AP device 110 and a second device such as the STA device 120, where the AP device 110 may comprise a processing circuit 112, at least one communications control circuit (e.g., one or more communications control circuits), which may be collectively referred to as the communications control circuit 114, and at least one antenna (e.g., one or more antennas) of the communications control circuit 114, and the STA device 120 may comprise a processing circuit 122, at least one communications control circuit (e.g., one or more communications control circuits), which may be collectively referred to as the communications control circuit 124, and at least one antenna (e.g., one or more antennas) of the communications control circuit 124.

The processing circuit 112 can be arranged to control operations of the AP device 110 to make the AP device 110 act as an AP in the wireless communications system 100, and the communications control circuit 114 can be arranged to perform communications control, and more particularly, perform wireless communications operations with the STA device 120 (e.g., the communications control circuit 124 thereof) for the AP device 110. In addition, the processing circuit 122 can be arranged to control operations of the STA device 120 to make the STA device 120 act as an STA in the wireless communications system 100, and the communications control circuit 124 can be arranged to perform communications control, and more particularly, perform wireless communications operations with the AP device 110 (e.g., the communications control circuit 114 thereof) for the STA device 120.

According to some embodiments, the processing circuit 112 can be implemented by way of at least one processor/microprocessor, at least one random access memory (RAM), at least one bus, etc., and the communications control circuit 114 can be implemented by way of at least one wireless network control circuit and at least one wired network control circuit, but the present invention is not limited thereto. In addition, the processing circuit 122 can be implemented by way of at least one processor/microprocessor, at least one RAM, at least one bus, etc., and the communications control circuit 124 can be implemented by way of at least one wireless network control circuit, but the present invention is not limited thereto.

Figure 2:
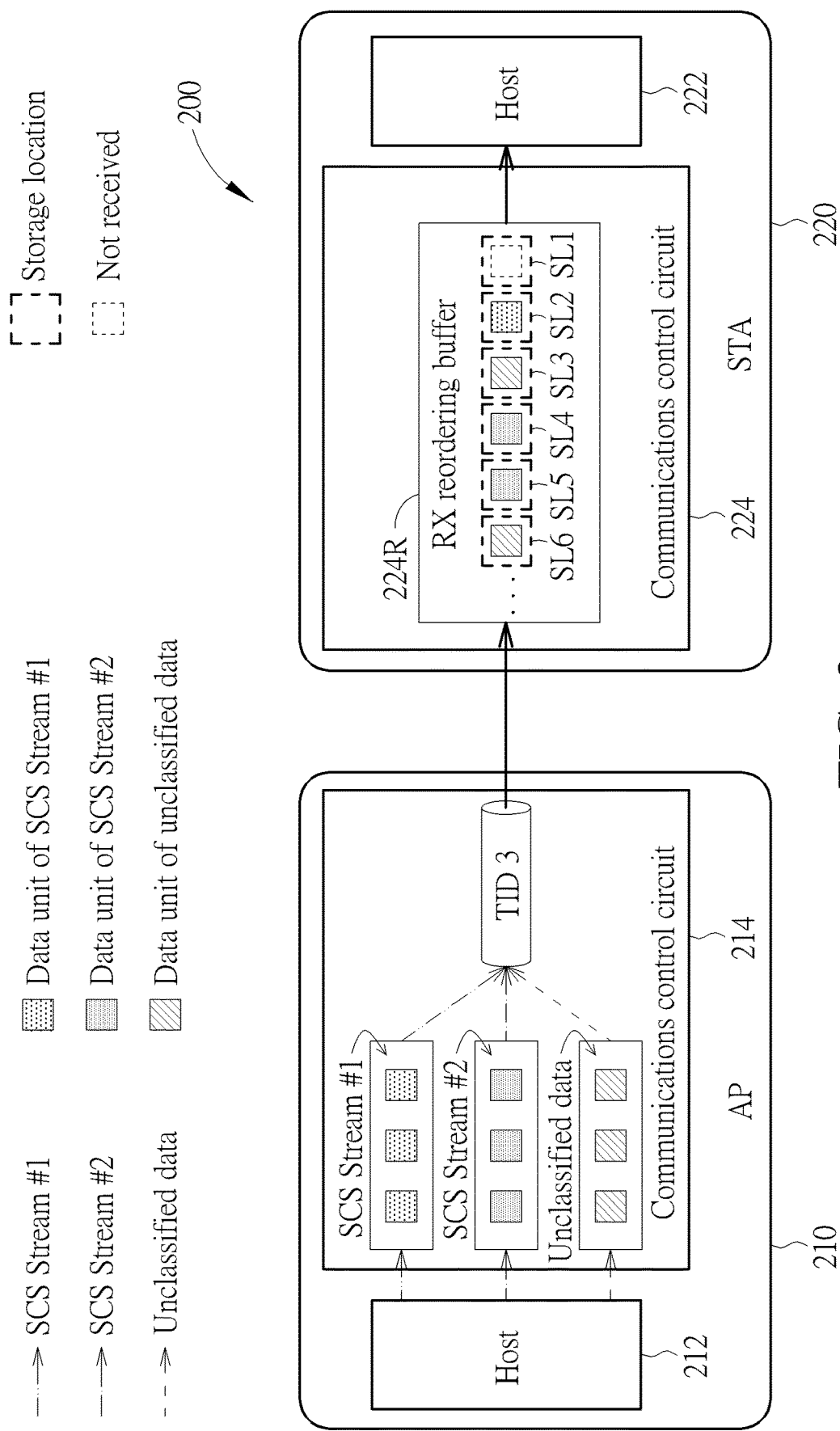
FIG. 2 is a diagram illustrating a first control scheme according to an embodiment of the present invention.

FIG. 2 is a diagram illustrating a first control scheme according to an embodiment of the present invention. A wireless communications system 200 may comprise an AP device 210 acting as an AP (labeled "AP" for brevity) in the wireless communications system 200, and may further comprise an STA device 220 acting as an STA (labeled "STA" for brevity) in the wireless communications system 200. The AP device 210 may comprise a host circuit 212 (e.g., at least one processor/microprocessor running program codes for controlling the AP) acting as a host in the AP (labeled "Host" for brevity) and further comprise at least one communications control circuit (e.g., one or more communications control circuits) such as the communications control circuit 214, etc., and the STA device 220 may comprise a host circuit 222 (e.g., at least one processor/microprocessor running program codes for controlling the STA) acting as a host in the STA (labeled "Host" for brevity) and further comprise at least one communications control circuit (e.g., one or more communications control circuits) such as the communications control circuit 224, etc. In addition, the AP device 210 (e.g., the communications control circuit 214) and the STA device 220 (e.g., the communications control circuit 224) can communicate with each other according to the IEEE 802.11 protocol. The AP device 210 and the STA device 220 shown in FIG. 2 can be taken as examples of the AP device 110 and the STA device 120 shown in FIG. 1, respectively, where the host circuit 212 and the communications control circuit 214 can be taken as examples of the processing circuit 112 and the communications control circuit 114, respectively, and the host circuit 222 and the communications control circuit 224 can be taken as examples of the processing circuit 122 and the communications control circuit 124, respectively. According to some viewpoints, the host circuits 212 and 222 can be regarded as the upper layers of the AP device 210 and the STA device 220, respectively, and the communications control circuits 214 and 224 can be regarded as the lower layers of the AP device 210 and the STA device 220, respectively, where the wireless communications system 200 comprising the AP device 210 and the STA device 220 can be regarded as a local area network (LAN), but the present invention is not limited thereto.

The data being transmitted from the AP device 210 to the STA device 220, such as the data being transmitted from the host circuit 212 to the host circuit 222 through the communications control circuits 214 and 224, may be obtained from at least one network (e.g., one or more networks) such as the Internet through wired or wireless connections, and more particularly, may comprise a first stream such as an SCS stream #1, a second stream such as an SCS stream #2, and other data or another stream such as unclassified data, but the present invention is not limited thereto. According to some embodiments, the streams under discussion (e.g., the first stream such as the SCS stream #1, the second stream such as the SCS stream #2, and the other stream such as the unclassified data as shown in FIG. 2) among the data being transmitted from the AP device 210 to the STA device 220 may vary, and the implementation of the present invention will not be hindered. For example, in a first case, the streams among the data being transmitted from the AP device 210 to the STA device 220 may comprise the first stream such as the SCS stream #1 and the other stream such as the unclassified data, without the second stream such as the SCS stream #2. For another example, in a second case, the streams among the data being transmitted from the AP device 210 to the STA device 220 may comprise the second stream such as the SCS stream #2 and the other stream such as the unclassified data, without the first stream such as the SCS stream #1. For yet another example, in a third case, the streams among the data being transmitted from the AP device 210 to the STA device 220 may comprise the first stream such as the SCS stream #1 and the second stream such as the SCS stream #2, without the other stream such as the unclassified data.

According to this embodiment, the original case that the streams among the data being transmitted from the AP device 210 to the STA device 220 comprise the first stream such as the SCS stream #1, the second stream such as the SCS stream #2, and the other stream such as the unclassified data can be taken as an example for better comprehension. At the AP side such as the AP device 210, the host circuit 212 can be arranged to prepare the first stream such as the SCS stream #1, the second stream such as the SCS stream #2, and the other stream such as the unclassified data, and more particularly, prepare respective data units of the first stream (e.g., the SCS stream #1), the second stream (e.g., the SCS stream #2), and the other stream (e.g., the unclassified data). In addition, the communications control circuit 214 can be arranged to map the first stream such as the SCS stream #1, the second stream such as the SCS stream #2, and the other stream such as the unclassified data to a same traffic identifier (TID), and combine the respective data units of the first stream (e.g., the SCS stream #1), the second stream (e.g., the SCS stream #2), and the other stream (e.g., the unclassified data) into a plurality of data units with a predetermined order, such as a series of data units having a series of serial numbers, respectively, for being sent to the STA side such as the STA device 220. For example, the aforementioned same TID can be a certain TID among a plurality of predetermined TIDs, such as one of the TIDs as defined in the one or more versions of the IEEE 802.11 standards, and more particularly, can be equal to three (labeled "TID 3" for better comprehension), but the present invention is not limited thereto. In some examples, the aforementioned same TID can be any TID among the plurality of predetermined TIDs, and more particularly, can be equal to any value selected from the values {0, 1, 2, 3, 4, 5, 6, 7}.

As shown in FIG. 2, the communications control circuit 224 at the STA side (e.g., the STA device 220) may comprise a reordering buffer on a receiving (RX) path, such as the RX reordering buffer 224R, where the RX reordering buffer 224R may comprise a plurality of storage locations (e.g. consecutive storage locations) such as a series of storage locations {SL1, SL2, SL3, SL4, SL5, SL6, . . . }, for buffering received data units that are sent from the AP device 210, such as at least one portion (e.g., a portion or all) of the plurality of data units with the predetermined order (e.g., the series of data units having the series of serial numbers, respectively). As the plurality of data units may be received by the STA device 220 in another order (e.g., a random order that is typically different from the predetermined order) due to some reasons such as interference and retransmission, the STA device 220 can utilize the RX reordering buffer 224R to perform reordering operations on the received data units, and more particularly, buffer (or temporarily store) the received data units at the plurality of storage locations such as the series of storage locations {SL1, SL2, SL3, SL4, SL5, SL6, . . . } according to the respective serial numbers of the received data units, to make the received data units that have been buffered in the RX reordering buffer 224R conform to the predetermined order, where one or more data units among the plurality of data units, such as the data unit that is expected to be buffered at the storage location SL1 according the serial number thereof, may have not been received and buffered in the RX reordering buffer 224R during the reordering operations (labeled "Not received" for brevity). As a result of performing the reordering operations, all of the plurality of data units may have been buffered in the RX reordering buffer 224R to conform to the predetermined order, and the communications control circuit 224 can perform a buffer flush operation, and more particularly, send or flush the plurality of data units conforming to the predetermined order from the RX reordering buffer 224R to the host circuit 222, for further processing in the host circuit 222.

According to some embodiments, the respective data units of the first stream (e.g., the SCS stream #1), the second stream (e.g., the SCS stream #2), and the other stream (e.g., the unclassified data) can be implemented by way of MSDUs, but the present invention is not limited thereto. According to some embodiments, the respective data units of the first stream (e.g., the SCS stream #1), the second stream (e.g., the SCS stream #2), and the other stream (e.g., the unclassified data) can be implemented by way of MPDUs. According to some embodiments, the respective data units of the first stream (e.g., the SCS stream #1), the second stream (e.g., the SCS stream #2), and the other stream (e.g., the unclassified data) can be implemented by way of one or a combination of MSDUs, MPDUs, and aggregate MSDUs (A-MSDUs).

According to some embodiments, the communications control circuit 214 at the AP side (e.g., the AP device 210) may comprise a transmitting (TX) buffer on a TX path, for preparing data units to be sent to the communications control circuit 224 at the STA side (e.g., the STA device 220). For brevity, similar descriptions for these embodiments are not repeated in detail here.

Figure 3:
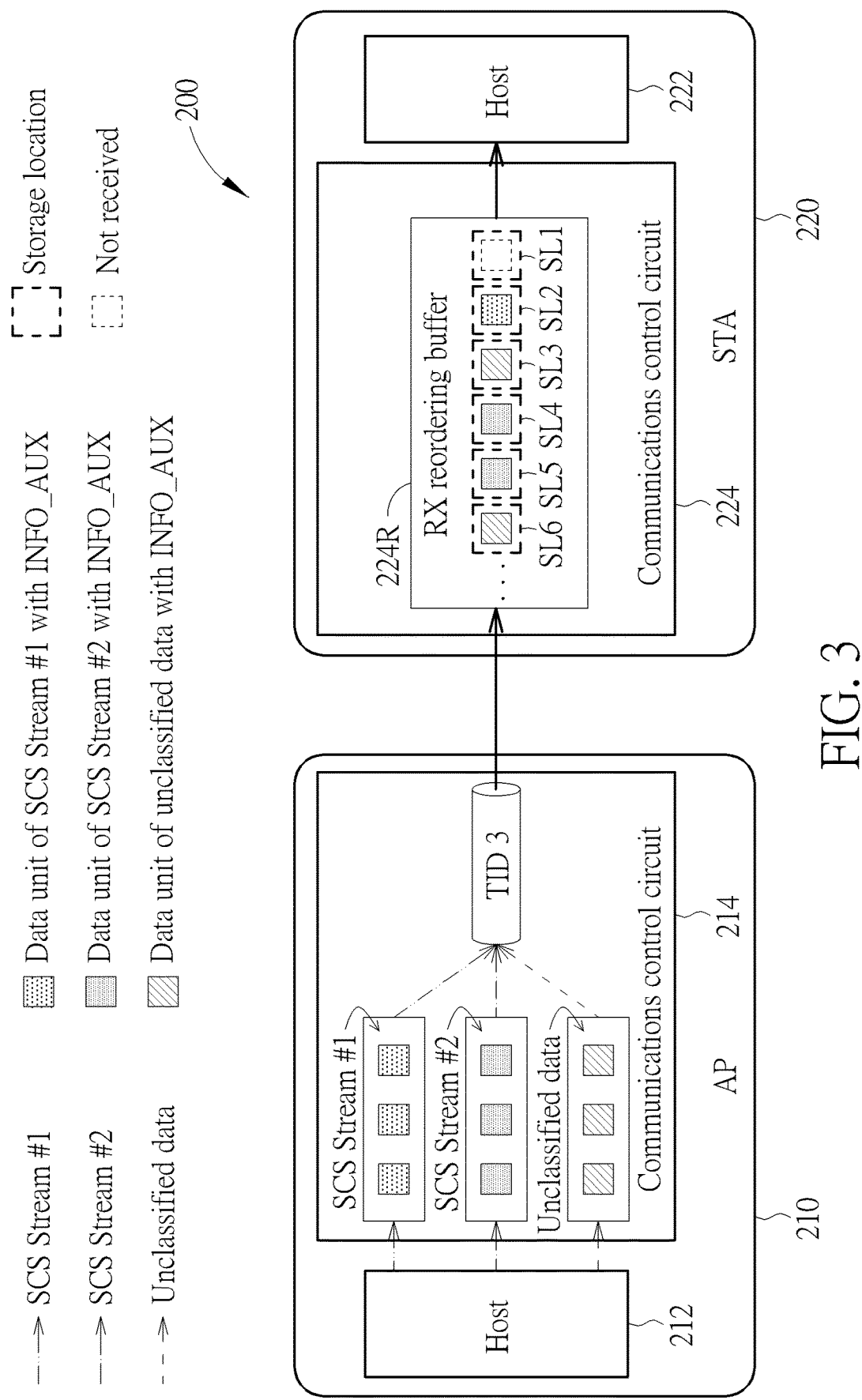
FIG. 3 is a diagram illustrating a feature-aware data processing control scheme of a method for performing traffic flow management in a wireless communications system with aid of auxiliary information according to an embodiment of the present invention.

FIG. 3 is a diagram illustrating a feature-aware data processing control scheme of a method for performing traffic flow management in a wireless communications system with aid of auxiliary information {INFO_AUX} according to an embodiment of the present invention, where the method can be applied to the wireless communications system 100 shown in FIG. 1 (e.g., the AP device 110 and the STA device 120 therein) such as the wireless communications system 200 shown in FIG. 2 (e.g., the AP device 210 and the STA device 220 therein). In comparison with the embodiment shown in FIG. 2, the AP side (e.g., the AP device 210) of the embodiment shown in FIG. 3 can control the data units of the first stream (e.g., the SCS stream #1), the data units of the second stream (e.g., the SCS stream #2), and the data units of the other stream (e.g., the unclassified data) to carry the auxiliary information {INFO_AUX} such as first auxiliary information INFO_AUX(1), second auxiliary information INFO_AUX(2), and other auxiliary information INFO_AUX(0) (labeled "with INFO_AUX" for brevity), respectively.

For example, the associated operations regarding the AP side may comprise:

(1) the wireless communications system 200 can utilize the AP device 210 to generate the first auxiliary information INFO_AUX(1) for the first stream such as the SCS stream #1 to make at least one first data unit (e.g., one or more first data units) of the first stream carry the first auxiliary information INFO_AUX(1), for example, by preparing the aforementioned at least one first data unit in the TX buffer to carry the first auxiliary information INFO_AUX(1) in the aforementioned at least one first data unit of the first data units in the first stream, where the first auxiliary information INFO- _AUX(1) may indicate at least one first feature (e.g., one or more first features) of the first stream, and more particularly, may comprise a first SCSID of the SCS stream #1;

(2) the wireless communications system 200 can utilize the AP device 210 to generate the second auxiliary information INFO_AUX(2) for the second stream such as the SCS stream #2 to make at least one second data unit (e.g., one or more second data units) of the second stream carry the second auxiliary information INFO_AUX(2), for example, by preparing the aforementioned at least one second data unit in the TX buffer to carry the second auxiliary information INFO_AUX(2) in the aforementioned at least one second data unit of the second data units in the second stream, where the second auxiliary information INFO_AUX(2) may indicate at least one second feature (e.g., one or more second features) of the second stream, and more particularly, may comprise a second SCSID of the SCS stream #2;

(3) the wireless communications system 200 can utilize the AP device 210 to generate the other auxiliary information INFO_AUX(0) for the other stream such as the unclassified data to make at least one other data unit (e.g., one or more other data units) of the other stream carry the other auxiliary information INFO_AUX(0), for example, by preparing the aforementioned at least one other data unit in the TX buffer to carry the other auxiliary information INFO_AUX(0) in the aforementioned at least one other data unit of the other data units in the other stream, where the other auxiliary information INFO_AUX(0) may indicate at least one other feature (e.g., one or more other features) of the other stream, and more particularly, may comprise a specific value as a null SCSID in an SCSID subfield of the other auxiliary information INFO_AUX(0), for example, the specific value may represent a predetermined value which is different from any of multiple valid SCSID, such as 255 or any of some other values; and (4) the wireless communications system 200 can utilize the AP device 210 to map the first stream such as the SCS stream #1 and the second stream such as the SCS stream #2 as well as the other stream such as the unclassified data to the same TID (e.g., TID=3), for example, by assigning the first stream such as the SCS stream #1 and the second stream such as the SCS stream #2 as well as the other stream such as the unclassified data to the same TID (e.g., TID=3), and send the aforementioned at least one first data unit carrying the first auxiliary information INFO_AUX(1) and the aforementioned at least one second data unit carrying the second auxiliary information INFO_AUX(2) as well as the aforementioned at least one other data unit carrying the other auxiliary information INFO_AUX(0) to the STA device 220, for accelerating processing of the first stream (e.g., the SCS stream #1) and the second stream (e.g., the SCS stream #2) in the STA device 220 with aid of the first auxiliary information INFO_AUX(1) and the second auxiliary information INFO_AUX(2), respectively;

wherein the AP device 210 can send the aforementioned at least one first data unit carrying the first auxiliary information INFO_AUX(1) and the aforementioned at least one second data unit carrying the second auxiliary information INFO_AUX(2) to the STA device 220, to allow the STA device 220 to accelerate the processing of the first stream and the second stream, such as the processing of the aforementioned at least one first data unit and the processing of the aforementioned at least one second data unit, according to the first auxiliary information INFO_AUX(1) (e.g., the first SCSID) and the second auxiliary information INFO_AUX(2) (e.g., the second SCSID), respectively, but the present invention is not limited thereto.

In addition, the associated operations regarding the STA side may comprise:

(1) the wireless communications system 200 can utilize the STA device 220 to receive the aforementioned at least one first data unit of the first stream (e.g., the SCS stream #1);

(2) the wireless communications system 200 can utilize the STA device 220 to receive the aforementioned at least one second data unit of the second stream (e.g., the SCS stream #2);

(3) the wireless communications system 200 can utilize the STA device 220 to receive the aforementioned at least one other data unit of the other stream (e.g., the unclassified data); and (4) the wireless communications system 200 can utilize the STA device 220 to accelerate the processing of the first stream and the second stream, such as the processing of the aforementioned at least one first data unit and the processing of the aforementioned at least one second data unit, according to the first auxiliary information INFO_AUX(1) (e.g., the first SCSID) and the second auxiliary information INFO_AUX(2) (e.g., the second SCSID), respectively.

Figure 4:
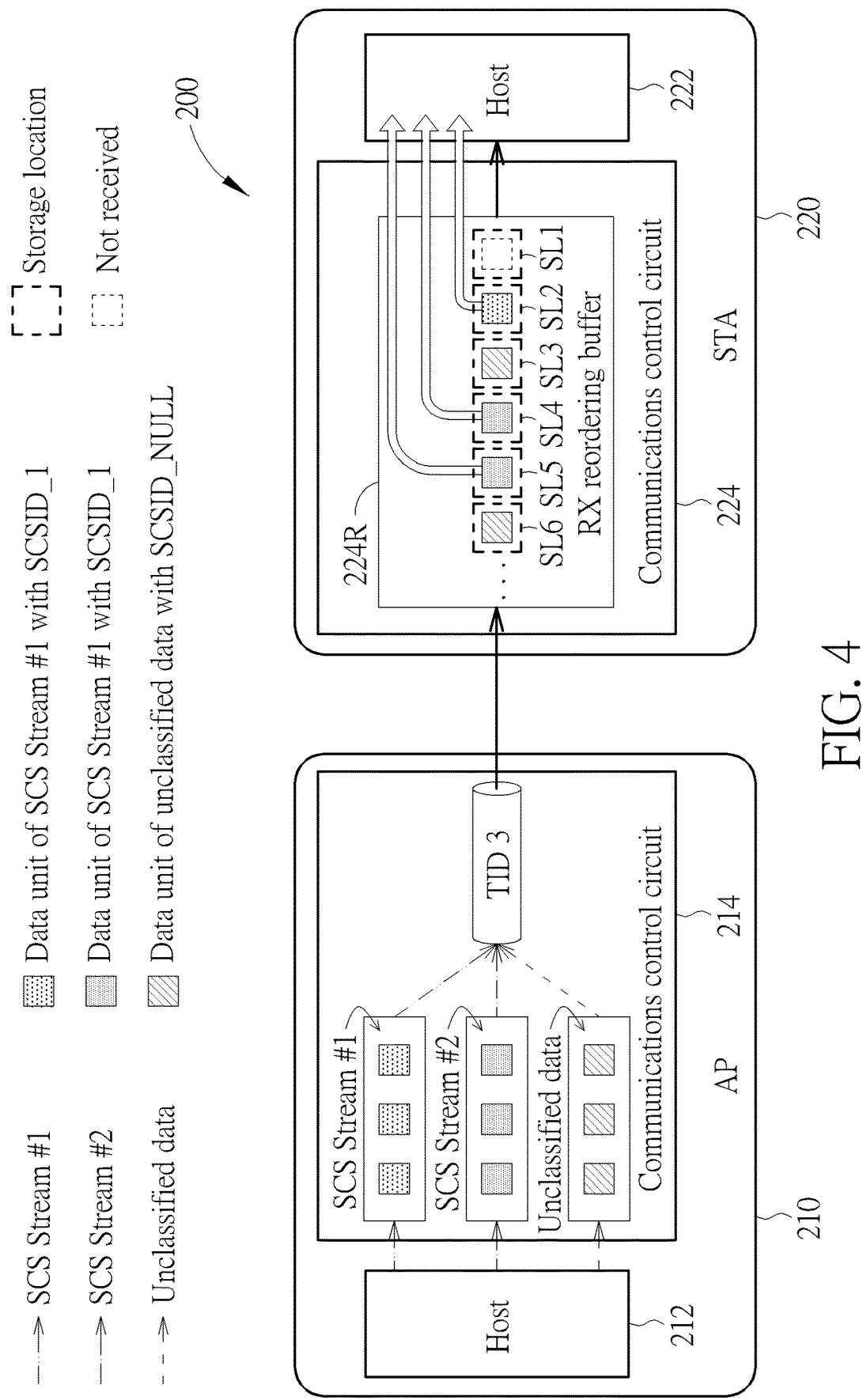
FIG. 4 is a diagram illustrating some implementation details of the feature-aware data processing control scheme shown in FIG. 3 according to an embodiment of the present invention.

FIG. 4 is a diagram illustrating some implementation details of the feature-aware data processing control scheme shown in FIG. 3 according to an embodiment of the present invention. As shown in FIG. 4, the AP side (e.g., the AP device 210) can control the data units of the first stream (e.g., the SCS stream #1), the data units of the second stream (e.g., the SCS stream #2), and the data units of the other stream (e.g., the unclassified data) to carry the first SCSID SCSID_1, the second SCSID SCSID_2, and the null SCSID SCSID_NULL, respectively. For example, multiple data units can be sent out from the AP side. In addition, the STA side (e.g., the STA device 220) can utilize the RX reordering buffer 224R to reorder the multiple data units received from the AP device 210 according to the respective serial numbers of the multiple data units, no matter whether the multiple data units are received from the AP device 210 according to the same order (e.g., the predetermined order) of the respective serial numbers of the multiple data units, but the present invention is not limited thereto. The STA device 220 can process some data units among the multiple data units buffered in the RX reordering buffer 224R first, having no need to wait for the reception of the whole of the plurality of data units conforming to the predetermined order.

The AP device 210 can send the aforementioned at least one first data unit carrying the first SCSID SCSID_1 and the aforementioned at least one second data unit carrying the second SCSID SCSID_2 to the STA device 220, to allow the STA device 220 to differentiate the SCS streams #1 and #2 and the other stream (e.g., the unclassified data) that are mapped or assigned to the same TID, and more particularly, identify the aforementioned at least one first data unit belonging to the SCS stream #1 and the aforementioned at least one second data unit belonging to the SCS stream #2 among the multiple data units buffered in the RX reordering buffer 224R of the STA device 220 to accelerate the respective processing of the aforementioned at least one first data unit and the aforementioned at least one second data unit.

Based on the auxiliary information {INFO_AUX} (e.g., the first auxiliary information INFO_AUX(1), the second auxiliary information INFO_AUX(2), and the other auxiliary information INFO_AUX(0)) such as the first SCSID SCSID_1, the second SCSID SCSID_2 and the null SCSID SCSID_NULL, the STA device 220 (e.g., the host circuit 222) can process the aforementioned at least one first data unit belonging to the SCS stream #1 and the aforementioned at least one second data unit belonging to the SCS stream #2 in advance, for example, earlier than the processing of the aforementioned at least one other data unit belonging to the other stream (e.g., the unclassified data), to accelerate the processing of the SCS stream #1 and the SCS stream #2, respectively. For example, the communications control circuit 224 can send the aforementioned at least one first data unit (e.g., the data unit buffered at the storage location SL2) belonging to the SCS stream #1 and the aforementioned at least one second data unit (e.g., the two data units buffered at the storage locations SL4 and SL5, respectively) belonging to the SCS stream #2 among the multiple data units buffered in the RX reordering buffer 224R to the host circuit 222, for further processing in the host circuit 222. For brevity, similar descriptions for this embodiment are not repeated in detail here.

According to some embodiments, the STA device 220 can specify at least one first quality of service (QoS) requirement (e.g., one or more first QoS requirements) and at least one second QoS requirement (e.g., one or more second QoS requirements) for the SCS stream #1 and the SCS stream #2, respectively, for example, by using traffic specification (TSPEC) elements as defined in the one or more versions of the IEEE 802.11 standards. In addition, the AP device 210 can apply the associated transmission policies to the aforementioned at least one first data unit and the aforementioned at least one second data unit to meet the aforementioned at least one first QoS requirement and the aforementioned at least one second QoS requirement, respectively, and to send the aforementioned at least one first data unit carrying the first SCSID SCSID_1 and the aforementioned at least one second data unit carrying the second SCSID SCSID_2 to the STA device 220, to allow the STA device 220 to process the aforementioned at least one first data unit and the aforementioned at least one second data unit in advance, for example, earlier than the processing of the aforementioned at least one other data unit belonging to the other stream (e.g., the unclassified data), to meet the aforementioned at least one first QoS requirement and the aforementioned at least one second QoS requirement, respectively. For example, the aforementioned at least one first QoS requirement may comprise a first delay bound of the aforementioned at least one first data unit, and the aforementioned at least one second QoS requirement may comprise a second delay bound of the aforementioned at least one second data unit. For another example, the aforementioned at least one first QoS requirement may comprise a first minimum delivery rate of the aforementioned at least one first data unit, and the aforementioned at least one second QoS requirement may comprise a second minimum delivery rate of the aforementioned at least one second data unit. For brevity, similar descriptions for these embodiments are not repeated in detail here.

According to some embodiments, the STA device 220 can specify at least one first classification rule and at least one second classification rule for the SCS stream #1 and the SCS stream #2, respectively, for example, by using traffic classification (TCLAS) elements as defined in the one or more versions of the IEEE 802.11 standards. In addition, the AP device 210 can classify the aforementioned at least one first data unit and the aforementioned at least one second data unit according to the aforementioned at least one first classification rule and the aforementioned at least one second classification rule, respectively, and send the aforementioned at least one first data unit carrying the SCSID SCSID_1 and the aforementioned at least one second data unit carrying the second SCSID SCSID_2 to the STA device 220, to allow the STA device 220 to process the aforementioned at least one first data unit and the aforementioned at least one second data unit in advance, for example, earlier than the processing of the aforementioned at least one other data unit belonging to the other stream (e.g., the unclassified data). For brevity, similar descriptions for these embodiments are not repeated in detail here.

Figure 5:
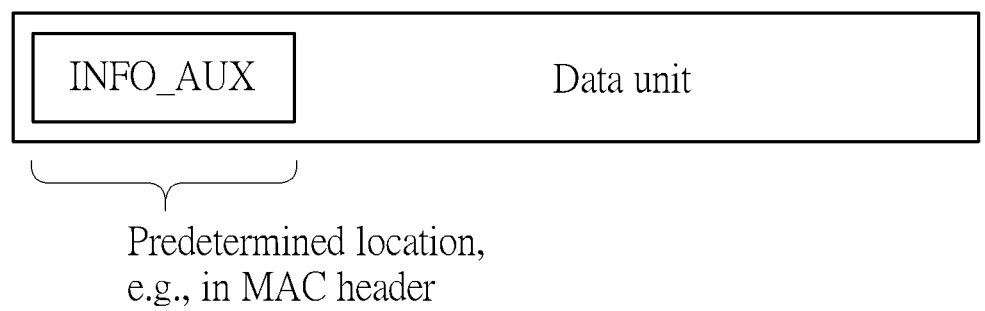
FIG. 5 is a diagram illustrating an auxiliary information control scheme of the method according to an embodiment of the present invention.

FIG. 5 is a diagram illustrating an auxiliary information control scheme of the method according to an embodiment of the present invention. The AP side (e.g., the AP device 210) can set the auxiliary information INFO_AUX (e.g., one of the first auxiliary information INFO_AUX(1), the second auxiliary information INFO_AUX(2), and the other auxiliary information INFO_AUX(0)) at a predetermined location in any data unit among the respective data units of the SCS streams #1 and #2 and the other stream (e.g., the unclassified data). More particularly, the predetermined location may represent at least one field (e.g., one or more fields) within a predetermined portion of the aforementioned any data unit. For example, the predetermined portion can be a MAC header, but the present invention is not limited thereto. For brevity, similar descriptions for this embodiment are not repeated in detail here.

According to some embodiments, the auxiliary information {INFO_AUX} such as the first auxiliary information INFO_AUX(1), the second auxiliary information INFO_AUX(2), and the other auxiliary information INFO_AUX(0) may comprise other indications, such as other information and/or other indicators. For example, any auxiliary information INFO_AUX among the first auxiliary information INFO_AUX(1), the second auxiliary information INFO_AUX(2), and the other auxiliary information INFO_AUX(0) may comprise a buffer flush request. In addition, the AP device 210 can notify the STA device 220 of the buffer flush request, for example, through the aforementioned at least one first data unit, the aforementioned at least one second data unit or the aforementioned at least one other data unit, to allow the STA device 220 to flush out at least one portion of data units (e.g., a portion of data units, or all data units) among the multiple data units buffered in the RX reordering buffer 224R of the STA device 220. For brevity, similar descriptions for these embodiments are not repeated in detail here.

According to an embodiment, the aforementioned any auxiliary information INFO_AUX comprising the buffer flush request may represent the first auxiliary information INFO_AUX(1), and the aforementioned at least one portion of data units may comprise all data units carrying the first SCSID SCSID_1 among the multiple data units buffered in the RX reordering buffer 224R. For example, when there is no more data unit that is a part of the SCS stream #1 to be transmitted to the STA device 220 in the near future (e.g., in a predetermined period, such as a time interval corresponding to a predetermined length of time), the AP device 210 can transmit the aforementioned at least one first data unit carrying both of the first SCSID SCSID_1 and the buffer flush request to the STA device 220. For another example, the STA device 220 can specify the aforementioned at least one first QoS requirement for the SCS stream #1. In this situation, the aforementioned at least one first QoS requirement may comprise the first delay bound of the aforementioned at least one first data unit. When the aforementioned at least one first data unit (e.g., at least one MSDU) that is sent out from the AP device 210 is close to the delay bound requirement of the first delay bound (e.g., when a difference between a first estimated delay of the aforementioned at least one first data unit that is sent out from the AP device 210 and the first delay bound is less than a predetermined threshold), the AP device 210 can transmit the aforementioned at least one first data unit carrying both of the first SCSID SCSID_1 and the buffer flush request to the STA device 220. For brevity, similar descriptions for this embodiment are not repeated in detail here.

According to another embodiment, the aforementioned any auxiliary information INFO_AUX comprising the buffer flush request may represent the second auxiliary information INFO_AUX(2), and the aforementioned at least one portion of data units may comprise all data units carrying the second SCSID SCSID_2 among the multiple data units buffered in the RX reordering buffer 224R. For example, when there is no more data unit that is a part of the SCS stream #2 to be transmitted to the STA device 220 in the near future (e.g., in a predetermined period, such as a time interval corresponding to the predetermined length of time), the AP device 210 can transmit the aforementioned at least one second data unit carrying both of the second SCSID SCSID_2 and the buffer flush request to the STA device 220. For another example, the STA device 220 can specify the aforementioned at least one second QoS requirement for the SCS stream #2. In this situation, the aforementioned at least one second QoS requirement may comprise the second delay bound of the aforementioned at least one second data unit. When the aforementioned at least one second data unit (e.g., at least one MSDU) that is sent out from the AP device 210 is close to the delay bound requirement of the second delay bound (e.g., when a difference between a second estimated delay of the aforementioned at least one second data unit that is sent out from the AP device 210 and the second delay bound is less than the predetermined threshold), the AP device 210 can transmit the aforementioned at least one second data unit carrying both of the second SCSID SCSID_2 and the buffer flush request to the STA device 220. For brevity, similar descriptions for this embodiment are not repeated in detail here.

According to yet another embodiment, the aforementioned any auxiliary information INFO_AUX comprising the buffer flush request may represent the other auxiliary information INFO_AUX(0), and the aforementioned at least one portion of data units may comprise all data units carrying the null SCSID SCSID_NULL among the multiple data units buffered in the RX reordering buffer 224R. For example, when there is no more data unit that is a part of the other stream (e.g., the unclassified data) to be transmitted to the STA device 220 in the near future (e.g., in a predetermined period, such as a time interval corresponding to the predetermined length of time), the AP device 210 can transmit the aforementioned at least one other data unit carrying both of the null SCSID SCSID_NULL and the buffer flush request to the STA device 220. For another example, the STA device 220 can specify at least one other QoS requirement for the other stream (e.g., the unclassified data). In this situation, the aforementioned at least one other QoS requirement may comprise at least one other delay bound of the aforementioned at least one other data unit. When the aforementioned at least one other data unit (e.g., at least one MSDU) that is sent out from the AP device 210 is close to the delay bound requirement of the other delay bound (e.g., when a difference between an estimated delay of the aforementioned at least one other data unit that is sent out from the AP device 210 and the other delay bound is less than the predetermined threshold), the AP device 210 can transmit the aforementioned at least one other data unit carrying both of the null SCSID SCSID_NULL and the buffer flush request to the STA device 220. For brevity, similar descriptions for this embodiment are not repeated in detail here.

TABLE 1

| Control ID value | Meaning | Control | SCSID | Buffer flush request | Optional transmission block | Optional maximum period bound |
|---|---|---|---|---|---|---|
| TBD | SCS procedure assistance | 2 bits | 8 bits | 1 bit | TBD | TBD |

Note #1:
1. SCSID is for the accompanying MSDU(s);
2. The SCSID needs buffer flush and the SCSID is not related to the accompanying MSDU(s)/A-MSDU:
(a), along with a specific SCSID, e.g., 255, to request flushing all SCS flows; and
3. The existence of optional subfields; where control bits can be used to indicate the existence of optional subfields.
Note #2:
When using A-ctrl to indicate the SCSID of MSDU, the MSDU or the MSDUs of the A-MSDU inside the MPDU have to belong to the same TID and the same SCS flow.

Table 1 illustrates an example of a format of the auxiliary information INFO_AUX at the predetermined location such as an aggregated control (A-Control) field (labeled "A-ctrl" in Note #2 shown above for brevity) within the aforementioned any data unit among the respective data units of the SCS streams #1 and #2 and the other stream (e.g., the unclassified data), where the SCSID and the buffer flush request can be carried in the A-Control field (e.g. the A-Control subfield in the High Throughput (HT) Control Field format as defined in the one or more versions of the IEEE 802.11 standards). As shown in Table 1, the format of the auxiliary information INFO_AUX may comprise multiple subfields, for example:

(1) the subfield "Control ID value": the Control Identifier (ID) of the auxiliary information INFO_AUX, where "Meaning" shown in Table 1 may indicate that this Control ID can be related to SCS procedure assistance, but the present invention is not limited thereto;

(2) the subfield "Control": a subfield that can be arranged to carry multiple control bits (e.g., two control bits) for indicating whether a first optional subfield such as the subfield "Optional transmission block" exists and whether a second optional subfield such as the subfield "Optional maximum period bound" exists, respectively, wherein one control bit (e.g., the first control bit) among the multiple control bits may indicate whether the subfield "Optional transmission block" exists, and another control bit (e.g., the second control bit) among the multiple control bits may indicate whether the subfield "Optional maximum period bound" exists;

(3) the subfield "SCSID": a subfield that can be arranged to carry the SCSID (e.g., the first SCSID SCSID_1, the second SCSID SCSID_2, etc. for the SCS streams #1, #2, etc., respectively, or the null SCSID SCSID_NULL for the other stream such as the unclassified data) in the aforementioned any data unit, wherein, for an example, the SCSID may be for the accompanying MSDU(s), or for another example, the SCSID may need buffer flush and the SCSID may be not related to the accompanying MSDU(s)/A-MSDU along with the null SCSID SCSID_NULL such as a specific SCSID (e.g., 255) to request flushing all SCS flows;

(4) the subfield "Buffer flush request": a subfield that can be arranged to carry the buffer flush request;

(5) the subfield "Optional transmission block": an optional subfield that can be arranged to carry the SCS transmission block information for controlling or suggesting the STA side to process at least the aforementioned any data unit in advance; and (6) the subfield "Optional maximum period bound": an optional subfield that can be arranged to carry the maximum period bound for controlling or suggesting the STA side to process at least the aforementioned any data unit in advance, such as the maximum period bound to stay in the RX reordering buffer 224R of the STA device 220; where the multiple subfields listed above may have predetermined bit counts, respectively, and the respective predetermined bit counts of some subfields among the multiple subfields can be arbitrary determined in advance as long as implementation of the present invention is not hindered, and therefore can be regarded as "To Be Determined" (labeled "TBD" for brevity). For brevity, similar descriptions for this embodiment are not repeated in detail here.

According to some embodiments, regarding the maximum period bound that the subfield "Optional maximum period bound" mentioned above can be arranged to carry, the STA device 220 can initialize an SCS procedure with respect to the AP device 210, to specify a first traffic flow such as the first stream as the SCS stream #1 with the first SCSID SCSID_1 and specify a second traffic flow such as the second stream as the SCS stream #2 with the second SCSID SCSID_2, where the first auxiliary information INFO_AUX (1) may comprise the first SCSID SCSID_1, and the second auxiliary information INFO_AUX(2) may comprise the second SCSID SCSID_2. In addition, after the SCS procedure is completed, the AP device 210 can analyze the SCS stream #1 and the SCS stream #2 to determine a first maximum period bound and a second maximum period bound regarding staying in the RX reordering buffer 224R of the STA device 220 for the aforementioned at least one first data unit and the aforementioned at least one second data unit, respectively, where the first auxiliary information INFO_AUX(1) may comprise the first maximum period bound in the subfield "Optional maximum period bound" thereof, and the second auxiliary information INFO_AUX (2) may comprise the second maximum period bound in the subfield "Optional maximum period bound" thereof.

More particularly, the AP device 210 can send the aforementioned at least one first data unit carrying the first maximum period bound and the aforementioned at least one second data unit carrying the second maximum period bound to the STA device 220, to allow the STA device 220 to process a set of first data units carrying the first SCSID SCSID_1 in the RX reordering buffer 224R if a first time period in which the set of first data units stay in the RX reordering buffer 224R reaches the first maximum period bound, and to process a set of second data units carrying the second SCSID SCSID_2 in the RX reordering buffer 224R if a second time period in which the set of second data units stay in the RX reordering buffer 224R reaches the second maximum period bound. For brevity, similar descriptions for these embodiments are not repeated in detail here.

According to some embodiments, regarding the SCS transmission block information that the subfield "Optional transmission block" mentioned above can be arranged to carry, the STA device 220 can initialize the SCS procedure with respect to the AP device 210, to specify the first traffic flow such as the first stream as the SCS stream #1 with the first SCSID SCSID_1 and specify the second traffic flow such as the second stream as the SCS stream #2 with the second SCSID SCSID_2, where the first auxiliary information INFO_AUX(1) may comprise the first SCSID SCSID_1, and the second auxiliary information INFO_AUX (2) may comprise the second SCSID SCSID_2. In addition, after the SCS procedure is completed, the AP device 210 can analyze the SCS stream #1 and the SCS stream #2 to generate first SCS transmission block information and second SCS transmission block information, respectively, for indicating a first size-related parameter of the SCS stream #1 and a second size-related parameter of the SCS stream #2, respectively, where the first auxiliary information INFO_AUX(1) may comprise the first SCS transmission block information (e.g., the first size-related parameter) in the subfield "Optional transmission block" thereof, and the second auxiliary information INFO_AUX(2) may comprise the second SCS transmission block information (e.g., the second size-related parameter) in the subfield "Optional transmission block" thereof. For better comprehension, the first size-related parameter may represent the size or sum of the number of data units (e.g., MSDUs) that are parts of the SCS stream #1 among the multiple data units buffered in the RX reordering buffer 224R, and the second size-related parameter may represent the size or sum of the number of data units (e.g., MSDUs) that are parts of the SCS stream #2, but the present invention is not limited thereto.

More particularly, the AP device 210 can send the aforementioned at least one first data unit carrying the first SCS transmission block information and the aforementioned at least one second data unit carrying the second SCS transmission block information to the STA device 220, to allow the STA device 220 to process a set of first data units carrying the first SCSID SCSID_1 in the RX reordering buffer 224R if a first size of the set of first data units buffered in the RX reordering buffer 224R reaches the first size-related parameter indicated by the first SCS transmission block information, and to process a set of second data units carrying the second SCSID SCSID_2 in the RX reordering buffer 224R if a second size of the set of second data units buffered in the RX reordering buffer 224R reaches the second size-related parameter indicated by the second SCS transmission block information. For brevity, similar descriptions for these embodiments are not repeated in detail here.

Figure 6:
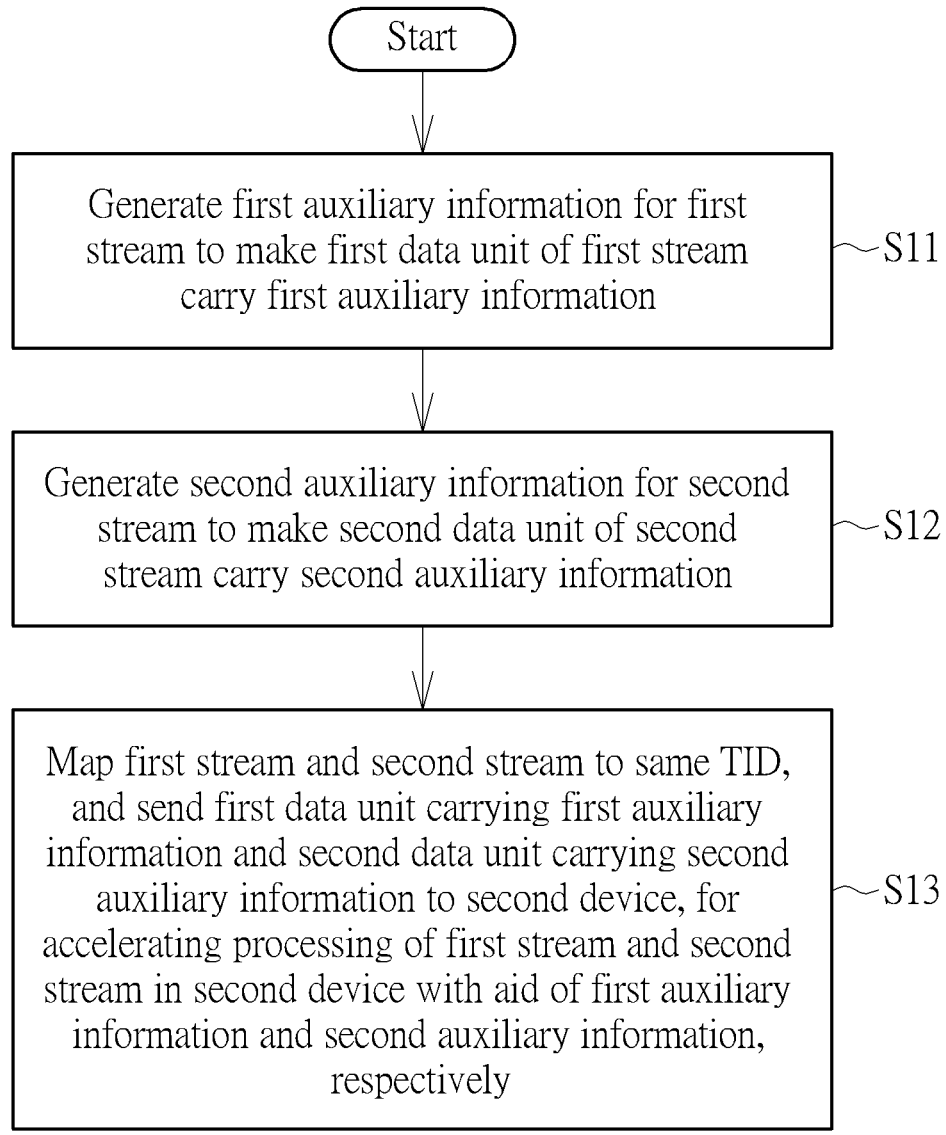
FIG. 6 illustrates a working flow of the method according to an embodiment of the present invention.

FIG. 6 illustrates a working flow of the method according to an embodiment of the present invention, where the method is applicable to the first device (e.g., the AP device 110 such as the AP device 210) that is wirelessly connected to the second device (e.g., the STA device 120 such as the STA device 220).

In Step S11, the wireless communications system 200 can utilize the AP device 210 to generate the first auxiliary information INFO_AUX(1) for the first stream such as the SCS stream #1 to make the aforementioned at least one first data unit of the first stream carry the first auxiliary information INFO_AUX(1), for example, by preparing the aforementioned at least one first data unit in the TX buffer to carry the first auxiliary information INFO_AUX(1) in the aforementioned at least one first data unit of the first data units in the first stream, where the first auxiliary information INFO_AUX(1) may comprise the first SCSID SCSID_1 of the SCS stream #1.

In Step S12, the wireless communications system 200 can utilize the AP device 210 to generate the second auxiliary information INFO_AUX(2) for the second stream such as the SCS stream #2 to make the aforementioned at least one second data unit of the second stream carry the second auxiliary information INFO_AUX(2), for example, by preparing the aforementioned at least one second data unit in the TX buffer to carry the second auxiliary information INFO_AUX(2) in the aforementioned at least one second data unit of the second data units in the second stream, where the second auxiliary information INFO_AUX(2) may comprise the second SCSID SCSID_2 of the SCS stream #2, but the present invention is not limited thereto. According to some embodiments, the wireless communications system 200 can utilize the AP device 210 to prepare the aforementioned at least one second data unit without any auxiliary information such as the second auxiliary information INFO_AUX(2) in the TX buffer. For example, in a situation where the aforementioned at least one second data unit does not carry any auxiliary information such as the second auxiliary information INFO_AUX(2), the second stream such as the SCS stream #2 will not be specified by the second SCSID SCSID_2, and more particularly, the field for indicating SCSID is not even carried in the header (e.g., no such SCSID field is in the header).

In Step S13, the wireless communications system 200 can utilize the AP device 210 to map the first stream such as the SCS stream #1 and the second stream such as the SCS stream #2 to the same TID (e.g., TID=3), and send the aforementioned at least one first data unit carrying the first auxiliary information INFO_AUX(1) and the aforementioned at least one second data unit carrying the second auxiliary information INFO_AUX(2) to the second device such as the STA device 220, for accelerating the processing of the first stream (e.g., the SCS stream #1) and the second stream (e.g., the SCS stream #2) in the second device such as the STA device 220 with aid of the first auxiliary information INFO_AUX(1) and the second auxiliary information INFO_AUX(2), respectively. More particularly, the AP device 210 can map the SCS stream #1 and the SCS stream #2 as well as the other stream (e.g., the unclassified data) to the same TID, for example, by assigning the SCS stream #1 and the SCS stream #2 as well as the other stream (e.g., the unclassified data) to the same TID, and send the aforementioned at least one first data unit carrying the first auxiliary information INFO_AUX(1), the aforementioned at least one second data unit carrying the second auxiliary information INFO_AUX(2), and the aforementioned at least one other data unit carrying the other auxiliary information INFO_AUX(0) to the STA device 220.

Based on the auxiliary information {INFO_AUX} (e.g., the first auxiliary information INFO_AUX(1), the second auxiliary information INFO_AUX(2), and the other auxiliary information INFO_AUX(0)) such as the first SCSID SCSID_1, the second SCSID SCSID_2 and the null SCSID SCSID_NULL, the STA device 220 can process the aforementioned at least one first data unit belonging to the SCS stream #1 and the aforementioned at least one second data unit belonging to the SCS stream #2 in advance, but the present invention is not limited thereto. The auxiliary information {INFO_AUX} such as the first auxiliary information INFO_AUX(1), the second auxiliary information INFO_AUX(2), and the other auxiliary information INFO_AUX(0) may further comprise the other indications, such as the other information and/or the other indicators as shown in Table 1, to allow the STA device 220 to process the associated data unit in the RX reordering buffer 224R as soon as possible. For brevity, similar descriptions for this embodiment are not repeated in detail here.

For better comprehension, the method may be illustrated with the working flow shown in FIG. 6, but the present invention is not limited thereto. According to some embodiments, one or more steps may be added, deleted, or changed in the working flow shown in FIG. 6.

Figure 7:
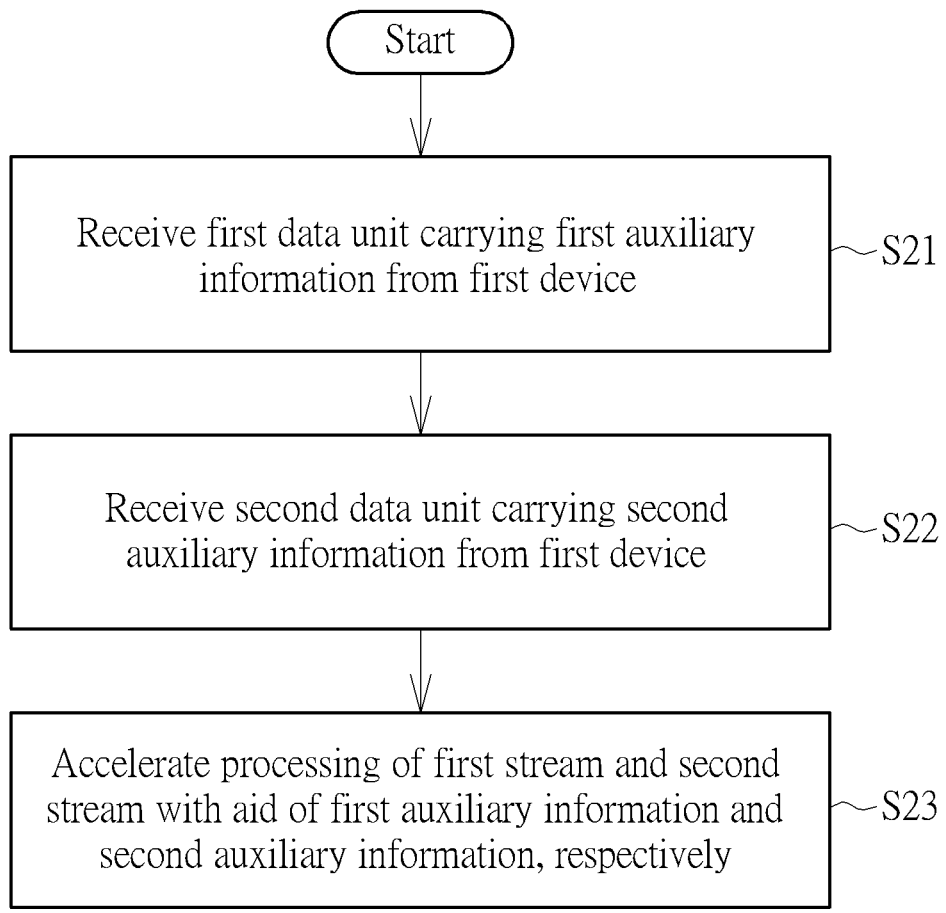
FIG. 7 illustrates a working flow of the method according to another embodiment of the present invention.

FIG. 7 illustrates a working flow of the method according to another embodiment of the present invention, where the method is applicable to the second device (e.g., the STA device 120 such as the STA device 220) that is wirelessly connected to the first device (e.g., the AP device 110 such as the AP device 210).

In Step S21, the wireless communications system 200 can utilize the STA device 220 to receive the aforementioned at least one first data unit carrying the first auxiliary information INFO_AUX(1) from the first device such as the AP device 210, where the aforementioned at least one first data unit carrying the first auxiliary information INFO_AUX(1) can be taken as an example of multiple data units of the first stream (e.g., the SCS stream #1).

In Step S22, the wireless communications system 200 can utilize the STA device 220 to receive the aforementioned at least one second data unit carrying the second auxiliary information INFO_AUX(2) from the first device such as the AP device 210, where the aforementioned at least one second data unit carrying the second auxiliary information INFO_AUX(2) can be taken as an example of multiple data units of the second stream (e.g., the SCS stream #2), but the present invention is not limited thereto. According to some embodiments, the wireless communications system 200 can utilize the STA device 220 to receive the aforementioned at least one second data unit without any auxiliary information such as the second auxiliary information INFO_AUX(2). For example, in a situation where the aforementioned at least one second data unit does not carry any auxiliary information such as the second auxiliary information INFO_AUX(2), the second stream such as the SCS stream #2 will not be specified by the second SCSID SCSID_2, and more particularly, the field for indicating SCSID is not even carried in the header (e.g., no such SCSID field is in the header).

More particularly, the wireless communications system 200 can utilize the STA device 220 to receive the aforementioned at least one other data unit carrying the other auxiliary information INFO_AUX(0) from the first device such as the AP device 210, where the aforementioned at least one other data unit carrying the other auxiliary information INFO_AUX(0) can be taken as an example of multiple data units of the other stream (e.g., the unclassified data).

In Step S23, the wireless communications system 200 can utilize the STA device 220 to accelerate the processing of the first stream and the second stream, such as the processing of the aforementioned at least one first data unit and the processing of the aforementioned at least one second data unit, according to the first auxiliary information INFO_AUX(1) (e.g., the first SCSID SCSID_1) and the second auxiliary information INFO_AUX(2) (e.g., the second SCSID SCSID_2), respectively.

Based on the auxiliary information {INFO_AUX} (e.g., the first auxiliary information INFO_AUX(1), the second auxiliary information INFO_AUX(2), and the other auxiliary information INFO_AUX(0)) such as the first SCSID SCSID_1, the second SCSID SCSID_2 and the null SCSID SCSID_NULL, the STA device 220 can process the aforementioned at least one first data unit belonging to the SCS stream #1 and the aforementioned at least one second data unit belonging to the SCS stream #2 in advance, but the present invention is not limited thereto. As the auxiliary information {INFO_AUX} such as the first auxiliary information INFO_AUX(1), the second auxiliary information INFO_AUX(2), and the other auxiliary information INFO_AUX(0) may further comprise the other indications, such as the other information and/or the other indicators as shown in Table 1, the STA device 220 can process the associated data unit in the RX reordering buffer 224R as soon as possible. For brevity, similar descriptions for this embodiment are not repeated in detail here.

For better comprehension, the method may be illustrated with the working flow shown in FIG. 7, but the present invention is not limited thereto. According to some embodiments, one or more steps may be added, deleted, or changed in the working flow shown in FIG. 7.

In one or more of the embodiments described above, the original case that the streams among the data being transmitted from the AP device 210 to the STA device 220 comprise the first stream such as the SCS stream #1, the second stream such as the SCS stream #2, and the other stream such as the unclassified data can be taken as an example for better comprehension, but the present invention is not limited thereto. According to some embodiments, any other case such as any case among the first case, the second case and the third case mentioned above can be described in a similar manner by omitting the associated descriptions of an omitted stream/data in the aforementioned any other case, for example, omitting the descriptions of the second stream such as the SCS stream #2 in the first case, omitting the descriptions of the first stream such as the SCS stream #1 in the second case, or omitting the descriptions of the other stream such as the unclassified data in the third case. For brevity, similar descriptions for these embodiments are not repeated in detail here.

Figure 8:
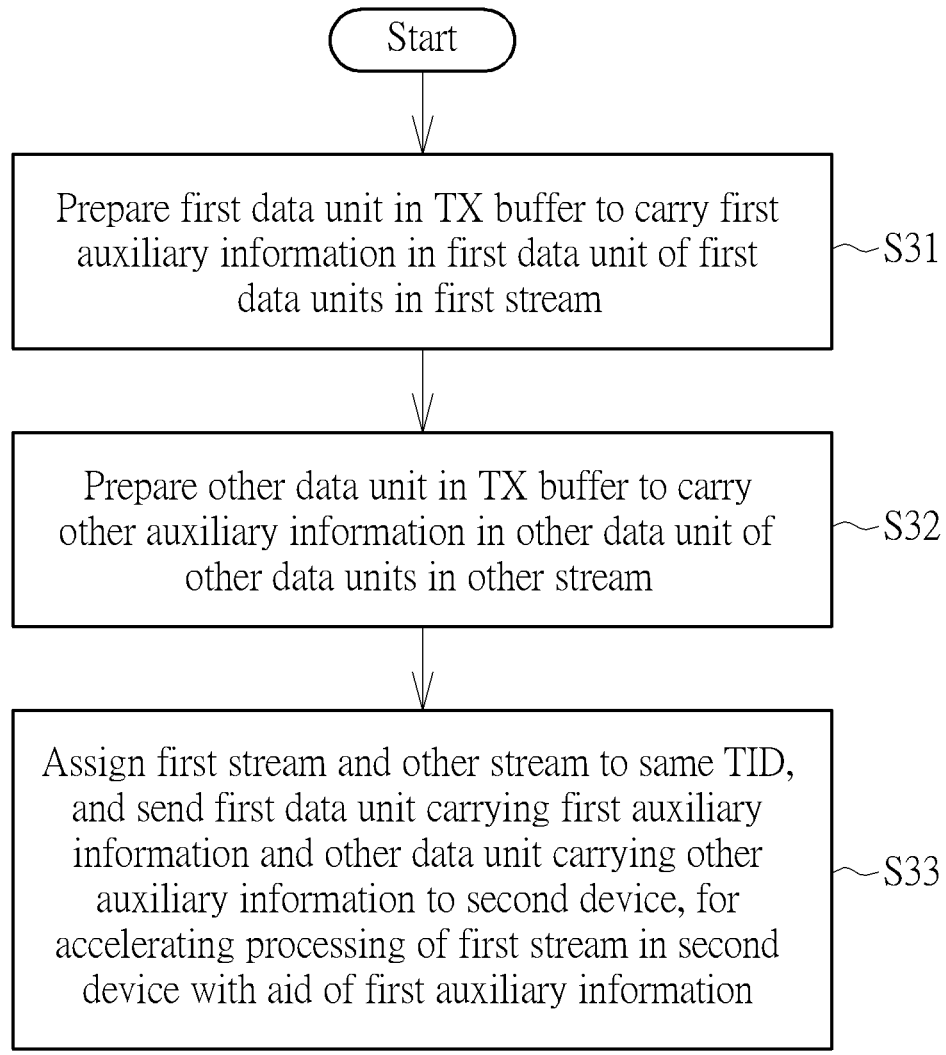
FIG. 8 illustrates a working flow of the method according to yet another embodiment of the present invention.

FIG. 8 illustrates a working flow of the method according to yet another embodiment of the present invention, where the method is applicable to the first device (e.g., the AP device 110 such as the AP device 210) that is wirelessly connected to the second device (e.g., the STA device 120 such as the STA device 220).

In Step S31, the wireless communications system 200 can utilize the AP device 210 to prepare the aforementioned at least one first data unit in the TX buffer to carry the first auxiliary information INFO_AUX(1) in the aforementioned at least one first data unit of the first data units in the first stream, where the first auxiliary information INFO_AUX(1) may comprise an indication of the first data units being part of the first stream, such as the first SCSID SCSID_1 of the SCS stream #1.

In Step S32, the wireless communications system 200 can utilize the AP device 210 to prepare the aforementioned at least one other data unit in the TX buffer to carry the other auxiliary information INFO_AUX(0) in the aforementioned at least one other data unit of the other data units in the other stream, where the other auxiliary information INFO_AUX(0) may comprise the null SCSID SCSID_NULL of the other stream, for indicating that the other stream is a non-SCS stream, but the present invention is not limited thereto. According to some embodiments, the wireless communications system 200 can utilize the AP device 210 to prepare the aforementioned at least one other data unit without any auxiliary information such as the other auxiliary information INFO_AUX(0) in the TX buffer. For example, in a situation where the aforementioned at least one other data unit does not carry any auxiliary information such as the other auxiliary information INFO_AUX(0), the other stream such as the non-SCS stream will not be specified by the null SCSID SCSID_NULL, and more particularly, the field for indicating SCSID is not even carried in the header (e.g., no such SCSID field is in the header). According to some embodiments, the aforementioned at least one other data unit that does not carry any auxiliary information such as the other auxiliary information INFO_AUX(0) can be a MSDU, and this MSDU can also be regarded as a non-SCS stream.

In Step S33, the wireless communications system 200 can utilize the AP device 210 to assign the first stream such as the SCS stream #1 and the other stream such as the unclassified data to the same TID (e.g., TID=3), and send the aforementioned at least one first data unit carrying the first auxiliary information INFO_AUX(1) and the aforementioned at least one other data unit carrying the other auxiliary information INFO_AUX(0) to the second device such as the STA device 220, for accelerating the processing of the first stream (e.g., the SCS stream #1) in the second device such as the STA device 220 with aid of the first auxiliary information INFO_AUX(1). For example, in a situation where the other stream is the non-SCS stream, the first SCSID SCSID_1 of the SCS stream #1 allows the STA device 220 to differentiate the SCS stream #1 from the non-SCS stream with the same TID.

Based on the auxiliary information {INFO_AUX} (e.g., the first auxiliary information INFO_AUX(1) and the other auxiliary information INFO_AUX(0)) such as the first SCSID SCSID_1 and the null SCSID SCSID_NULL, the STA device 220 can process the aforementioned at least one first data unit belonging to the SCS stream #1 in advance, where the first data units in the first stream and the other data units in the other stream can be MSDUs, and the first auxiliary information INFO_AUX(1) can be carried in a header of one MPDU, but the present invention is not limited thereto. For brevity, similar descriptions for this embodiment are not repeated in detail here.

For better comprehension, the method may be illustrated with the working flow shown in FIG. 8, but the present invention is not limited thereto. According to some embodiments, one or more steps may be added, deleted, or changed in the working flow shown in FIG. 8.

In the embodiment shown in FIG. 8, the AP device 210 can be arranged to send the aforementioned at least one first data unit carrying the first SCSID SCSID_1 of the SCS stream #1 to the STA device 220, to allow the STA device 220 to identify the aforementioned at least one first data unit belonging to the SCS stream #1 among the multiple data units buffered in the RX reordering buffer 224R of the STA device 220, but the present invention is not limited thereto. According to some embodiments, the first auxiliary information INFO_AUX(1) carried by the aforementioned at least one first data unit may further comprise a buffering indication of the SCS stream #1, and the buffering indication of the SCS stream #1 may indicate whether a first buffer flush request such as the buffer flush request mentioned above is sent by the AP device 210, where the first buffer flush request allows the STA device 220 to flush out the buffered first data units. For example, the STA device 220 may be arranged to specify a first QoS requirement such as the aforementioned at least one first QoS requirement for the SCS stream #1, and the first QoS requirement may comprise the first delay bound. In response to the difference between the first estimated delay of the aforementioned at least one first data unit that is sent out from the AP device 210 and the first delay bound being less than or equal to the predetermined threshold, the first buffer flush request is sent using the buffering indication in the first auxiliary information INFO_AUX(1) carried by the aforementioned at least one first data unit. More particularly, the first auxiliary information INFO_AUX(1) carried by the aforementioned at least one first data unit may further comprise a first transmission block indication such as the first SCS transmission block information mentioned above, indicating a size threshold of the buffered first data units to allow the STA device 220 to determine whether any transmission block is formed, where the priority of the first buffering indication indicating the first buffer flush request is higher than the priority of the first transmission block indication. For brevity, similar descriptions for these embodiments are not repeated in detail here.

According to some embodiments, the first auxiliary information INFO_AUX(1) carried by the aforementioned at least one first data unit may further comprise a first maximum period bound indication such as the first maximum period bound mentioned above, where the first maximum period bound indication is related to a time duration of the set of first data units buffered in the RX reordering buffer 224R. For example, the first maximum period bound indication allows the STA device 220 to process the set of first data units carrying the first SCSID SCSID_1 in the RX reordering buffer 224R if the first time period in which the set of first data units stay in the RX reordering buffer 224R reaches the first maximum period bound indication. For brevity, similar descriptions for these embodiments are not repeated in detail here.

Figure 9:
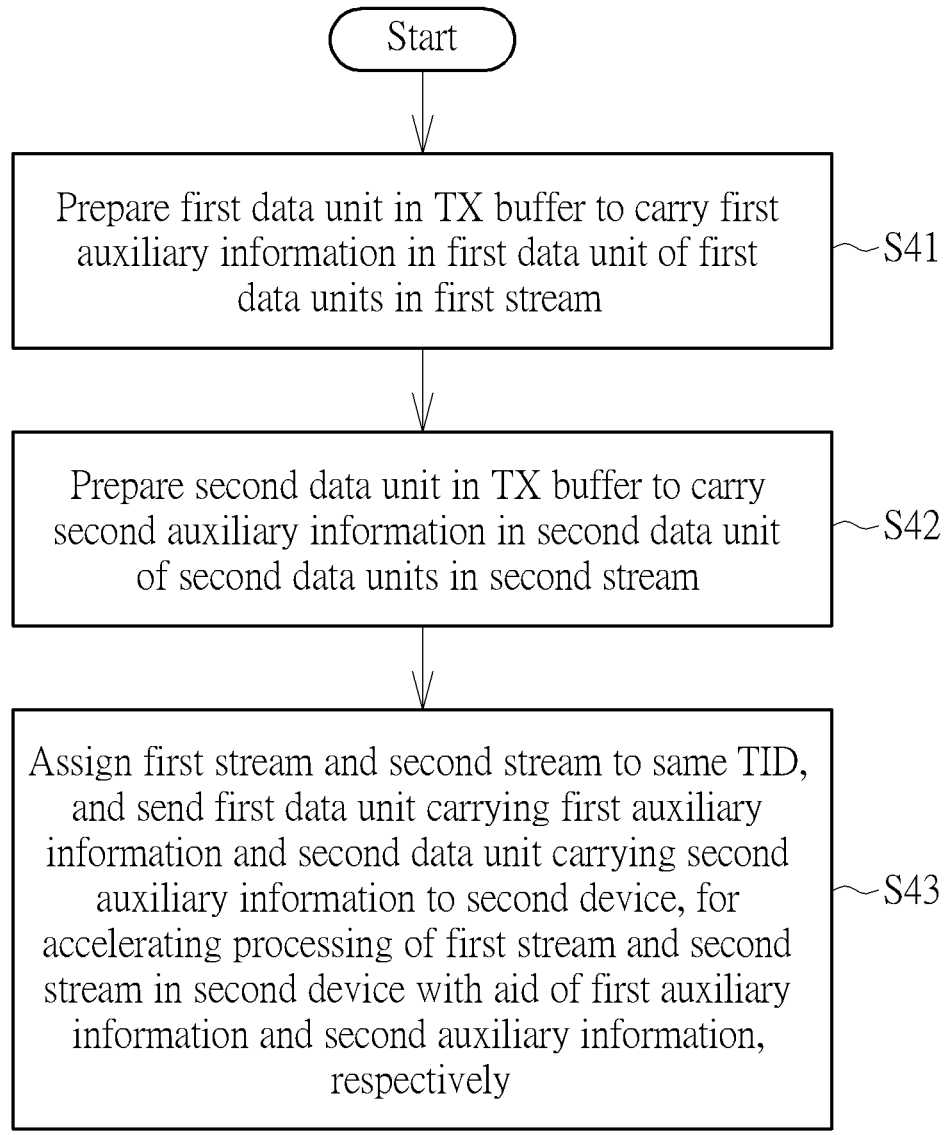
FIG. 9 illustrates a working flow of the method according to still another embodiment of the present invention.

FIG. 9 illustrates a working flow of the method according to still another embodiment of the present invention, where the method is applicable to the first device (e.g., the AP device 110 such as the AP device 210) that is wirelessly connected to the second device (e.g., the STA device 120 such as the STA device 220).

In Step S41, the wireless communications system 200 can utilize the AP device 210 to prepare the aforementioned at least one first data unit in the TX buffer to carry the first auxiliary information INFO_AUX(1) in the aforementioned at least one first data unit of the first data units in the first stream, where the first auxiliary information INFO_AUX(1) may comprise the indication of the first data units being part of the first stream, such as the first SCSID SCSID_1 of the SCS stream #1.

In Step S42, the wireless communications system 200 can utilize the AP device 210 to prepare the aforementioned at least one second data unit in the TX buffer to carry the second auxiliary information INFO_AUX(2) in the aforementioned at least one second data unit of the second data units in the second stream, where the second auxiliary information INFO_AUX(2) may comprise an indication of the second data units being part of the second stream, such as the second SCSID SCSID_2 of the SCS stream #2, but the present invention is not limited thereto. According to some embodiments, the wireless communications system 200 can utilize the AP device 210 to prepare the aforementioned at least one second data unit without any auxiliary information such as the second auxiliary information INFO_AUX(2) in the TX buffer. For example, in a situation where the aforementioned at least one second data unit does not carry any auxiliary information such as the second auxiliary information INFO_AUX(2), the second stream such as the SCS stream #2 will not be specified by the second SCSID SCSID_2, and more particularly, the field for indicating SCSID is not even carried in the header (e.g., no such SCSID field is in the header).

In Step S43, the wireless communications system 200 can utilize the AP device 210 to assign the first stream such as the SCS stream #1 and the second stream such as the SCS stream #2 to the same TID (e.g., TID=3), and send the aforementioned at least one first data unit carrying the first auxiliary information INFO_AUX(1) and the aforementioned at least one second data unit carrying the second auxiliary information INFO_AUX(2) to the second device such as the STA device 220, for accelerating the processing of the first stream (e.g., the SCS stream #1) and the second stream (e.g., the SCS stream #2) in the second device such as the STA device 220 with aid of the first auxiliary information INFO_AUX(1) and the second auxiliary information INFO_AUX(2), respectively. More particularly, the first auxiliary information INFO_AUX(1) and the second auxiliary information INFO_AUX(2) can provide priorities of processing the first data units in the SCS stream #1 and the second data units in the SCS stream #2 at the second device such as the STA device 220.

Based on the auxiliary information {INFO_AUX} (e.g., the first auxiliary information INFO_AUX(1) and the second auxiliary information INFO_AUX(2)) such as the first SCSID SCSID_1 and the second SCSID SCSID_2, the STA device 220 can process the aforementioned at least one first data unit belonging to the SCS stream #1 and the aforementioned at least one second data unit belonging to the SCS stream #2 in advance, where the first data units in the first stream and the second data units in the second stream can be MSDUs, and the first auxiliary information INFO_AUX(1) can be carried in a header of one MPDU, but the present invention is not limited thereto. For brevity, similar descriptions for this embodiment are not repeated in detail here.

For better comprehension, the method may be illustrated with the working flow shown in FIG. 9, but the present invention is not limited thereto. According to some embodiments, one or more steps may be added, deleted, or changed in the working flow shown in FIG. 9.

According to some embodiments, the first auxiliary information INFO_AUX(1) may exist in the first stream such as the SCS stream #1 on the TX preparation and the RX processing, but no auxiliary information INFO_AUX (e.g., the second auxiliary information INFO_AUX(2), or the other auxiliary information INFO_AUX(0)) may exist in another stream (e.g., the second stream such as the SCS stream #2, or the other stream such as the non-SCS stream) on the TX preparation and the RX processing. For example, the wireless communications system 200 can utilize the AP device 210 to prepare one SCS stream carrying its auxiliary information INFO_AUX (e.g., the SCS stream #1 carrying the first auxiliary information INFO_AUX(1)) and a non-SCS stream in which no SCS information is carried in the TX buffer, and utilize the STA device 220 to receive and temporarily store the one SCS stream carrying its auxiliary information INFO_AUX (e.g., the SCS stream #1 carrying the first auxiliary information INFO_AUX(1)) and the non-SCS stream in which no SCS information is carried into the RX reordering buffer 224R. For another example, the wireless communications system 200 can utilize the AP device 210 to prepare one SCS stream carrying its auxiliary information INFO_AUX (e.g., the SCS stream #1 carrying the first auxiliary information INFO_AUX(1)) and another SCS stream (e.g., the SCS stream #2) in which no SCS information is carried in the TX buffer, and utilize the STA device 220 to receive and temporarily store the one SCS stream carrying its auxiliary information INFO_AUX (e.g., the SCS stream #1 carrying the first auxiliary information INFO_AUX(1)) and the other SCS stream (e.g., the SCS stream #2) in which no SCS information is carried into the RX reordering buffer 224R. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing traffic flow management in a wireless communications system with aid of auxiliary information, the wireless communications system comprising a first device and a second device, the method being applicable to the first device, the method comprising:
carrying first auxiliary information in at least one first data unit of first data units in a first stream, wherein the first stream and a second stream are assigned to a same traffic identifier (TID); and
sending the at least one first data unit carrying the first auxiliary information and at least one second data unit in the second stream to the second device, wherein the first auxiliary information comprises an indication of the first data units being part of the first stream;
wherein the first stream is a first stream classification service (SCS) stream, wherein the indication in the first auxiliary information comprises a first SCS identifier (SCSID); the first device is arranged to send the at least one first data unit carrying the first SCSID to the second device, to allow the second device to identify the at least one first data unit belonging to the first SCS stream among multiple data units buffered in a reordering buffer of the second device; and the first auxiliary information carried by the at least one first data unit further comprises a buffering indication of the first SCS stream, and the buffering indication of the first SCS stream indicates whether a first buffer flush request is sent by the first device, wherein the first buffer flush request allows the second device to flush out the buffered first data units.

2. The method of claim 1, wherein the first device is an access point (AP) device, and the second device is a station (STA) device.

3. The method of claim 1, wherein the first data units and second data units are medium access control (MAC) service data units (MSDUs), and the first auxiliary information is carried in a header of one MAC protocol data unit (MPDU).

4. The method of claim 1, wherein the first SCS stream is generated considering a quality of service (QOS) requirement or a classification rule sent from the second device.

5. The method of claim 1, wherein the second device is arranged to specify a first quality of service (QOS) requirement for the first SCS stream, the first QoS requirement comprises a first delay bound, and in response to a difference between a first estimated delay of the at least one first data unit that is sent out from the first device and the first delay bound being less than or equal to a predetermined threshold, the first buffer flush request is sent using the buffering indication in the first auxiliary information carried by the at least one first data unit.

6. The method of claim 5, wherein the first auxiliary information carried by the at least one first data unit further comprises a first transmission block indication, indicating a size threshold of the buffered first data units to allow the second device to determine whether any transmission block is formed;
wherein, priority of the first buffering indication indicating the first buffer flush request is higher than priority of the first transmission block indication.

7. The method of claim 1, wherein the second stream is a non-SCS stream, and the first SCSID allows the second device to differentiate the first SCS stream from the non-SCS stream with the same TID.

8. The method of claim 1, wherein the first auxiliary information carried by the at least one first data unit further comprises a first maximum period bound indication, related to a time duration of a set of first data units buffered in the reordering buffer.

9. The method of claim 8, wherein the first maximum period bound indication allows the second device to process the set of first data units carrying the first SCSID in the reordering buffer if a first time period in which the set of first data units stay in the reordering buffer reaches the first maximum period bound indication.

10. The method of claim 1, wherein a second auxiliary information is carried in the at least one second data unit of second data units in the second stream, the first auxiliary information and the second auxiliary information provide priorities of processing the first data units and the second data units at the second device.

11. A first device, for performing traffic flow management in a wireless communications system with aid of auxiliary information, the wireless communications system comprising the first device and a second device, the first device comprising:
a processing circuit, arranged to control operations of the first device; and
at least one communications control circuit, coupled to the processing circuit, arranged to perform communications control, wherein the at least one communications control circuit is arranged to perform wireless communications operations with the second device for the first device;
wherein:
the first device is arranged to carry first auxiliary information in at least one first data unit of first data units in a first stream, wherein the first stream and a second stream are assigned to a same traffic identifier (TID); and
the first device is arranged to send the at least one first data unit carrying the first auxiliary information and at least one second data unit in the second stream to the second device, wherein the first auxiliary information comprises an indication of the first data units being part of the first stream;
wherein the first stream is a first stream classification service (SCS) stream, wherein the indication in the first auxiliary information comprises a first SCS identifier (SCSID); the first device is arranged to send the at least one first data unit carrying the first SCSID to the second device, to allow the second device to identify the at least one first data unit belonging to the first SCS stream among multiple data units buffered in a reordering buffer of the second device;
and the first auxiliary information carried by the at least one first data unit further comprises a buffering indication of the first SCS stream, and the buffering indication of the first SCS stream indicates whether a first buffer flush request is sent by the first device, wherein the first buffer flush request allows the second device to flush out the buffered first data units.

12. The first device of claim 11, wherein the first device is an access point (AP) device, and the second device is a station (STA) device.

13. The first device of claim 11, wherein the first data units and second data units are medium access control (MAC) service data units (MSDUs), and the first auxiliary information is carried in a header of one MAC protocol data unit (MPDU).

14. The first device of claim 11, wherein the first SCS stream is generated considering a quality of service (QOS) requirement or a classification rule sent from the second device.

15. The first device of claim 11, wherein the second device is arranged to specify a first quality of service (QOS) requirement for the first SCS stream, the first QoS requirement comprises a first delay bound, and in response to a difference between a first estimated delay of the at least one first data unit that is sent out from the first device and the first delay bound being less than or equal to a predetermined threshold, the first buffer flush request is sent using the buffering indication in the first auxiliary information carried by the at least one first data unit.

16. The first device of claim 15, wherein the first auxiliary information carried by the at least one first data unit further comprises a first transmission block indication, indicating a size threshold of the buffered first data units to allow the second device to determine whether any transmission block is formed; and priority of the first buffering indication indicating the first buffer flush request is higher than priority of the first transmission block indication.

17. The first device of claim 11, wherein the second stream is a non-SCS stream, and the first SCSID allows the second device to differentiate the first SCS stream from the non-SCS stream with the same TID.

18. The first device of claim 11, wherein the first auxiliary information carried by the at least one first data unit further comprises a first maximum period bound indication, related to a time duration of a set of first data units buffered in the reordering buffer.

19. The first device of claim 18, wherein the first maximum period bound indication allows the second device to process the set of first data units carrying the first SCSID in the reordering buffer if a first time period in which the set of first data units stay in the reordering buffer reaches the first maximum period bound indication.

20. The first device of claim 11, wherein a second auxiliary information is carried in the at least one second data unit of second data units in the second stream, the first auxiliary information and the second auxiliary information provide priorities of processing the first data units and the second data units at the second device.

* * * * *